US009883167B2

(12) United States Patent
Matthews et al.

(10) Patent No.: US 9,883,167 B2
(45) Date of Patent: Jan. 30, 2018

(54) PHOTOMETRIC THREE-DIMENSIONAL FACIAL CAPTURE AND RELIGHTING

(71) Applicant: Disney Enterprises, Inc., Burbank, CA (US)

(72) Inventors: Iain Matthews, Pittsburgh, PA (US); Paulo Urnau Gotardo, Burbank, CA (US); Tomas Simon, Pittsburgh, PA (US); Yaser Sheikh, Pittsburgh, PA (US)

(73) Assignees: Disney Enterprises, Inc., Burbank, CA (US); Carnegie Mellon University, Pittsburgh, PA (US)

( * ) Notice: Subject to any disclaimer, the term of this patent is extended or adjusted under 35 U.S.C. 154(b) by 257 days.

(21) Appl. No.: 14/866,540

(22) Filed: Sep. 25, 2015

(65) Prior Publication Data
US 2017/0094253 A1   Mar. 30, 2017

(51) Int. Cl.
*H04N 13/02* (2006.01)
*H04N 5/225* (2006.01)
*G06K 9/00* (2006.01)
*G06K 9/46* (2006.01)
*H04N 13/00* (2006.01)

(52) U.S. Cl.
CPC ..... *H04N 13/0239* (2013.01); *G06K 9/00221* (2013.01); *G06K 9/00255* (2013.01); *G06K 9/4661* (2013.01); *H04N 5/2256* (2013.01); *H04N 13/0246* (2013.01); *G06K 2209/401* (2013.01); *H04N 2013/0081* (2013.01); *H04N 2013/0085* (2013.01)

(58) Field of Classification Search
CPC ............. G06K 9/00255; G06K 9/4661; G06K 2209/401; H04N 5/2256; H04N 13/0239; H04N 13/0246; H04N 2013/0085; H04N 2013/0081
See application file for complete search history.

(56) References Cited

U.S. PATENT DOCUMENTS

| | | | |
|---|---|---|---|
| 2004/0184648 A1* | 9/2004 | Zhang | G06T 7/586 382/141 |
| 2010/0182406 A1* | 7/2010 | Benitez | G06T 7/55 348/46 |
| 2015/0254872 A1* | 9/2015 | de Almeida Barreto | G06T 7/208 382/103 |

OTHER PUBLICATIONS

Anderson, et al. "Color Photometric Stereo for Multicolored Surfaces," Proc. ICCV, 2011, pp. 2182-2189.
(Continued)

*Primary Examiner* — Sath V Perungavoor
*Assistant Examiner* — Peet Dhillon
(74) *Attorney, Agent, or Firm* — Patterson + Sheridan, LLP (57) ABSTRACT

Embodiments disclosed herein relate to a method and apparatus for generating a three-dimensional surface. In one embodiment, there is a method for generating a three-dimensional surface. The method includes capturing a plurality of images of a target object with at least two cameras, the target object illuminated by at least two sets of red-green-blue (RGB) lights positioned in an array about the target object and generating a three-dimensional surface of the target object by iteratively reconstructing a surface estimate of the target object and aligning images of the target object using motion estimation until the images converge, wherein the images are processed in n-frame intervals.

20 Claims, 5 Drawing Sheets

(56) References Cited

OTHER PUBLICATIONS

Baker, et al. "Lucas-Kanade 20 Years on: A Unifying Framework," International Journal of Computer Vision, vol. 56, No. 3, 2004, pp. 221-225.

Barksy, et al. "The 4-Source Photometric Stereo Technique for Three-Dimensional Surfaces in the Presence of Highlights and Shadows," IEEE Transactions on Pattern Analysis and Machine Intelligence, vol. 25, No. 10, 2003, pp. 1239-1252.

Basha, et al. "Multi-View Scene Flow Estimation: A View Centered Variational Approach" CVPR, 2010, pp. 1506-1513.

Basri, et al. "A Two-Frame Theory of Motion, Lighting and Shape" Proc. CVPR, 2008, pp. 1-7.

Beeler, et al. "High-Quality Passive Facial Performance Capture Using Anchor Frames" ACM SIGGRAPH 2011, vol. 10, pp. 1-75.

Brox, et al. "High Accuracy Optical Flow Estimation Based on a Theory for Warping" Proc. European Conference on Computer Vision, vol. 4, May 2004, pp. 25-36.

Du, et al. "Binocular Photometric Stereo" Proc. BMVC, 2011. (11 pages).

Forsyth, et al. "Computer Vision: A Modern Approach" Prentice Hall, Chapter 7, 2003, pp. 180-213.

Furukawa, et al. "Accurate, Dense, and Robust Multi-View Stereopsis" IEEE Transactions on Pattern Analysis and Machine Intelligence, vol. 32, No. 8, 2010, pp. 1362-1376.

Fyffe, et al. "Comprehensive Facial Performance Capture" Eurographics 2011, vol. 30, No. 2, 2011. (11 pages).

Fyffe, et al. "Single-Shot Photometric Stereo by Spectral Multiplexing" Proc. ICCP, 2011.

Hernandez, et al. "Non-Rigid Photometric Stereo with Colored Lights" Proc. ICCV, 2007, pp. 1-8.

Hernandez, et al. "Shadows in Three-Source Photometric Stereo" Proc. ECCV, 2008, pp. 290-303.

Hernandez, et al. "Overcoming Shadows in 3-Source Photometric Stereo" IEEE Transactions on Pattern Analysis and Machine Intelligence, vol. 33, No. 2, Feb. 2011, pp. 419-426.

Horn, et al. "Determining Optical Flow" Artificial Intelligence, vol. 17, No. 1-3, 2011, pp. 185-203.

Kim, et al. "Photometric Stereo for Dynamic Surface Orientations" Proc. ECCV, 2010, pp. 59-72.

Klaudiny, et al. "High-Detail 3D Capture and Non-Sequential Alignment of Facial Performance" Proc. 3DIM/3DPVT, 2012, pp. 17-24.

Liu, C. "Beyond Pixels: Exploring New Representations and Applications for Motion Analysis" PhD thesis, Massachussets Institute of Technology, 2009.

Ma, et al. "Rapid Acquisition of Specular and Diffuse Normal Maps from Polarized Spherical Gradient Illumination" Proc. Eurographics Conference on Rendering Technology, 2007, pp. 183-194.

Nehab, et al. "Efficiently Combining Positions and Normals for Precise 3D Geometry" ACM Trans. Graph., vol. 24, No. 3, 2005, pp. 536-543.

Papadhimitri, T., et al. "A New Perspective on Uncalibrated Photometric Stereo" Proc. CVPR, 2013, pp. 1474-1481.

Quiroga, J., et al. "Dense Semi-Rigid Scene Flow Estimation from RGBD Images" ECCV, 2014.

Valgaerts, et al. "Lightweight Binocular Facial Performance Capture Under Uncontrolled Lighting" ACM Trans. Graph., vol. 31, No. 6, 2012, pp. 1-187.

Vedula, et al. "Three-Dimensional Scene Flow", 7th International Conference on Computer Vision, Sep. 1999. (8 pages).

Vlasic, et al. "Dynamic Shape Capture Using Multi-View Photometric Stereo" ACM ToG (Proc. SIG-GRAPH Asia), vol. 28, No. 5, 2009.

Vogiatzis, et al. "Self-Calibrated, Multi-Spectral Photometric Stereo for 3D Face Capture" Int. J. Comput. Vision, vol. 97 No. 1, 2012, pp. 91-103.

Wedel, et al. "An Improved Algorithm for TV-L1 Optical Flow" Springer-Verlag, 2009, pp. 23-45.

Wenger, et al. "Performance Relighting and Reflectance Transformation with Time-Multiplexed Illumination" ACM SIG-GRAPH 2005 Papers, 2005, pp. 756-764.

Wilson, et al. "Temporal Upsampling of Performance Geometry Using Photometric Alignment" ACm Trans. Graph., vol. 29, No. 2, 2010.

Woodham, R. "Photometric Method for Determining Surface Orientation from Multiple Images" Optical Engineering, vol. 19, No. 1, Jan./Feb. 1980, pp. 139-144.

Jwoodham, R. "Gradient and Curvature from the Photometric Stereo Method, Including Local Confidence Estimation" Journal of the Optical Society of America, A, vol. 11, No. 11, 1994, pp. 3050-3068.

Zhang, et al. "Consistent Depth Maps Recovery from a Video Sequence" IEEE Transactions on Pattern Analysis and Machine Intelligence, vol. 31, No. 6, Jun. 2009, pp. 974-988.

Zhang, et al. "Shape and Motion Under Varying Illumination: Unifying Structure from Motion, Photometric Stereo, and Multi-View Stereo" Proc. IEEE ICCV, 2003.

Zhang, et al. "Spacetime Faces: High Resolution Capture for Modeling and Animation" ACM SIGGRAPH 2004 Papers, 2004, pp. 548-558.

Beeler, et al. "High-Quality Single-Shot Capture of Facial Geometry" ACM Trans. Graph., vol. 29, No. 4, 2010, pp. 1-40.

* cited by examiner

PHOTOMETRIC THREE-DIMENSIONAL FACIAL CAPTURE AND RELIGHTING

BACKGROUND

High-resolution geometry and appearances are invaluable assets in the movie and video game industries. A geometry generally refers to an (three-dimensional) object's structure, i.e., the triangles, lines, or points that compose the object, while an appearance generally refers to the object's shading, including its vertex and fragment shaders, and render state. The quality of a three-dimensional model can make or break the perceived realism of an animation. When it comes to facial models, people have a remarkably low threshold for inaccuracies. Even the smallest details in geometry and appearance are important. A variety of computer vision techniques have been developed for reconstructing high-detail geometry and appearances of real objects. However, each technique for constructing 3D models has its own particular limitations. Even when combined as independent processing stages, the combination of techniques can exacerbate errors introduced by early regularization, such as a smoothness constraint introduced by the early regularization.

SUMMARY

According to one embodiment, a method for generating a three-dimensional surface is disclosed herein. The method includes capturing a plurality of images of a target object with at least two cameras, the target object illuminated by at least three sets of red-green-blue (RGB) lights positioned in an array about the target object and generating a three-dimensional surface of the target object by iteratively reconstructing a surface estimate of the target object and aligning images of the target object using motion estimation until the images converge, wherein the images are processed in three-frame intervals.

According to one embodiment, a method for generating a three-dimensional surface is disclosed herein. The method includes capturing an image of a target object with two cameras, one camera positioned to a left of the target object, one camera position to a right of the target object, wherein the target object is illuminated by three sets of red-green-blue (RGB) lights positioned in an array about the target object processing the image in three frame intervals. Processing the image in three frame intervals includes recovering an unknown surface at each frame within the three-frame interval and recovering a backward motion and forward motion within the three-frame interval.

According to another embodiment, a system for reconstructing a three-dimensional surface is disclosed herein. The system includes at least two cameras, at least three sets of red-green-blue (RGB) lights, and a controller. A first camera is positioned to capture a right image of the target object. A second camera is positioned to capture a left image of the target object. The RGB lights are positioned in an array about the target object. The controller is configured to generate a three-dimensional surface of the target object by iteratively reconstructing a surface estimate of the target object and aligning images of the target object using motion estimation until the images converge, wherein the images are processed in three-frame intervals.

DETAILED DESCRIPTION

A variety of computer vision techniques have been developed for reconstructing high-detail geometry and appearances of real objects. Photometric stereo is one technique for estimating surface normal of objects by observing the objects under different illumination conditions. Multi-view stereo is another technique that reconstructs a 3D object model from a collection of images taken from known camera viewpoints. Photometric stereo is generally used to enhance the detail of an initial low-resolution geometry, most often obtained via the multi-view stereo technique. Although previously computed independently, photometric stereo and multi-view stereo techniques are complementary in nature. Photometric stereo provides continuous depth values even for textureless three-dimensional surfaces. However, photometric stereo suffers from integration drift, or relative depth. Multi-view stereo provides absolute depth, but the technique's estimates can suffer from matching errors, and spatial regularization further smooths fine detail. Regularization is a method that enables learning of mid-scale details without describing random error or noise but instead describing the underlying relationship. When photometric stereo and multi-view stereo are computed independently, the complementary nature of the two are under-explored. In dynamic photometric stereo reconstruction, object motion introduces an additional need to align images taken under significant changes in illumination, which remains a challenging problem. In other approaches, optical flow, which refers to a pattern of apparent motion of objects, surfaces, and edges in a visual scene caused by the relative motion between a camera and the scene, is used as a third independent component. However, the use of optical flow can lead to residual misalignment leading to a loss of detail.

Accordingly, embodiments of the present disclosure provides an approach for dynamic 3D capture of real objects that simultaneously computes photometric stereo, multi-view stereo, and optical flow in a coupled manner. In this approach, the photometric stereo technique not only benefits from, but also facilitates the computation of multi-view stereo and optical flow. Together, the described approach can provide highly-detailed 3D geometry, appearances, and instantaneous 3D motion (flow). The described technique, referred to herein as photogeometric scene flow, can provide dense estimates of 3D motion but at an increased level of geometric detail and with re-lightable, full-color object appearance.

The capture of dynamic events, such as 3D facial expressions, is restricted by a short time window to sample instantaneous surface geometry and appearance (e.g., a smile appears quickly). Accordingly, embodiments of the present disclosure provide a Lambertian model with five degrees of freedom (normal and RGB albedo). Thus, highlights and shadows are outliers that can be detected and ignored. Highlights can also be filtered out by cross-polarizing light and sensor.

To fit the Lambertian model, each surface patch (pixel) of a target object is observed under at least five different illumination conditions. Using color- and time-multiplexed illumination, at least two consecutive video frames (i.e., 6 color channels) are used. The use of video frames introduces the need for adequate motion compensation. Still, due to self-shadows, just two frames can be insufficient to provide enough samples for many surface patches of non-convex shapes, i.e., regions around the nose and cheeks on a human face. Furthermore, using a minimal number of observations can make the results more sensitive to image degradations and pixel noise.

Figure 1:
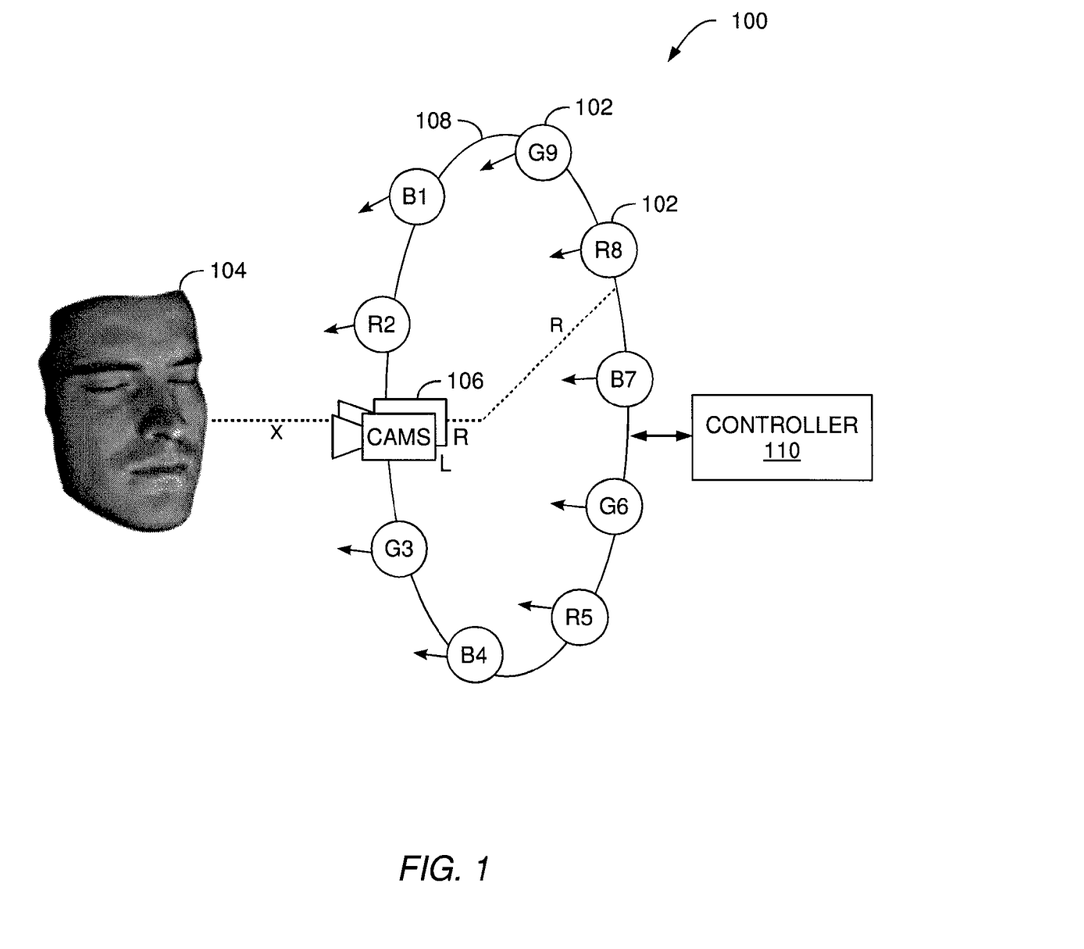
FIG. 1 is a block diagram depicting a system for acquiring image data of an object and generating a three-dimensional geometry and appearance of that object, according to one embodiment of the present disclosure.

FIG. 1 illustrates one embodiment of a system 100 for acquiring image data of an object and generating a three-dimensional geometry and appearance of that object. The system 100 includes a plurality of colored light sources 102 configured to illuminate a target object 104. In one example, the target object 104 is a human face, although other objects may be captured by the system 100. The system 100 further includes at least two cameras 106 configured to capture video of the target object 104. In some embodiments, the colored light sources 102 and cameras 106 are configured for sampling reflectance of the target object 104 under a set of directional illumination, within an n-frame time window.

In one embodiment, the system 100 includes a controller 110 configured to control operations of the colored light sources 102 and the cameras 106 and capture image data of the target object 104 for processing. The controller 110 is further configured to process the image data to reconstruct a 3D geometry and appearance corresponding to the target object. For simplicity of explanation, the controller 110 is described herein as performing capturing and processing functions. In alternative embodiments, the controller 110 can provide the captured image data to a separate processing system, which then generates a 3D geometry and appearance.

In one embodiment, the plurality of colored light sources 102 is positioned in an array about the target object 104. Each of the colored light sources 102 might be comprised of a cluster of LEDs of a single color—referred to using the labels red, green, and blue—approximately matching the peak wavelength sensitivity of each of the sensors of the cameras 106 (which are typically RGB camera sensors). In the embodiment depicted in FIG. 1, the colored light sources 102 are mounted in a light rig 108 in a substantially circular configuration. The light rig 108 has a radius R, for example, 60 cm radius. In one embodiment, the cameras 106 are disposed proximate to the center of the light rig 108 and are positioned at a distance X from the target object, for example, 200 cm away from the target object.

The colored light sources 102 are organized into sets (e.g., triplets) of RGB sources. The arrangement of sets is selected so as to spread out light sources (in time and space) to reduce the interaction of the lights' shadow areas on the target object. For example, a first triplet is comprised of the lights labelled R5, G6, B1, a second triplet is comprised of lights R2, G9, B4, and a third triplet is comprised of R8, G3, B7, although it is understood that the triplets of lights may be defined in other ways.

In one embodiment, the cameras 106 are configured as part of a binocular setup in which the cameras 106 are synchronized to observe the target object 104 under the same illumination conditions (i.e., light sources 102), which varies over time. One of the cameras 106 is positioned to capture a plurality of images from a left side perspective of the target object (referred to herein as "left images") and the other of the cameras is positioned to capture a plurality of images from the right side perspective of the object ("right images"). It is understood that embodiments of the present disclosure can be extended to utilize more than two cameras for capturing images from a variety of perspectives of the target object 104.

Figure 2:
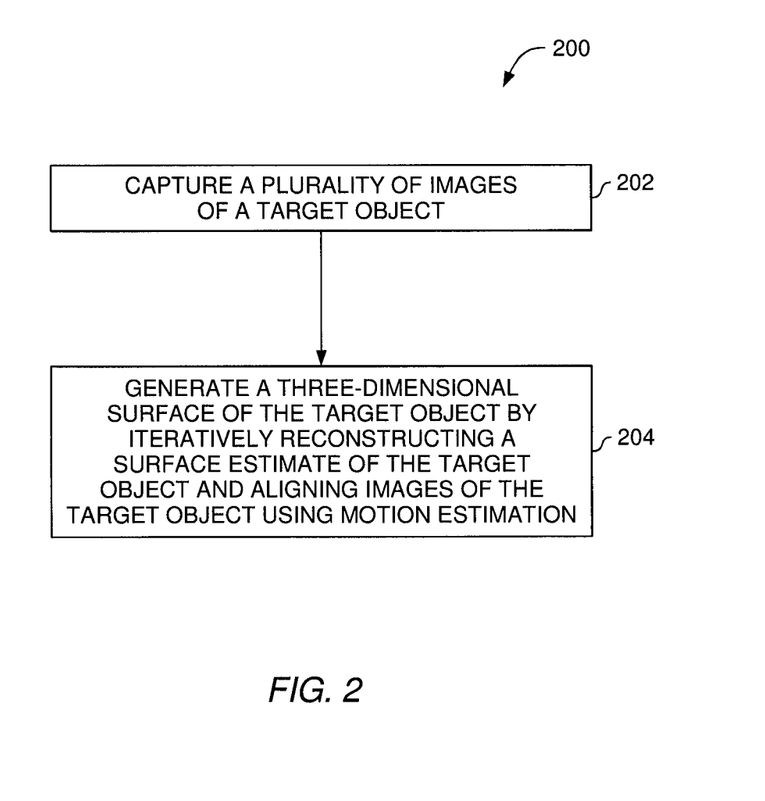
FIG. 2 is a flow diagram illustrating a method for generating a three-dimensional geometry and appearance, according to one embodiment.

FIG. 2 illustrates a method 200 for generating a three-dimensional geometry and appearance, according to one embodiment disclosed herein. While the method 200 is described in conjunction with the system 100 of FIG. 1, it is understood that other suitable systems can be utilized to perform the described technique.

The method 200 begins at step 202. At step 202, the controller 110 operates the plurality of colored light sources 102 and the at least two cameras 106 to capture a plurality of images of a target object 104. The colored light sources 102 are organized into sets (e.g., triplets) of RGB sources. The controller 110 turns on each set of colored light sources 102 to illuminate the target object 104, one at a time, in a sequential manner, each for the duration of one video frame.

For example, while capturing a first video frame with both cameras 106, the controller 110 turns on the first triplet of lights (R5, G6, B1) and illuminates the target object 104. At a next video frame, the controller 110 captures images of the target object with cameras 106 while illuminating the target object using the second triplet of lights (R2, G9, B4). At a next video frame, the controller 110 turns on the third triplet of lights (R8, G3, B7) and captures image data of the target object under this sample of illumination. Accordingly, for every three-frame video interval, the controller 110 has captured image data of the target object in nine different illumination conditions. For purposes of discussion herein, captured video data may be considered a sequence of images, also referred herein as image data, frames, video frames, and so forth.

Referring back to FIG. 2, at step 204, a three-dimensional surface of the target object is generated. A controller, such as controller 110, may generate the three-dimensional surface by iteratively reconstructing a surface estimate of the target object and aligning images of the target object using motion estimation until the images converge.

The approach of method 200 is to recover the three-dimensional geometry and RGB albedo of the target object at each time t. To do this, step 204 is performed sequentially within a three-frame sliding window centered at the current frame $t_w$ in both camera views. Image alignment aids in making full use of constraints in this time window. The controller estimates the surface motion between frames $(t_w, t_w+1)$ and $(t_w, t_w-1)$. Due to nonrigid motion, possible occlusion and the discrete nature of images, the backwards motion $(t_w, t_w-1)$ is differentiated from the forwards motion $(t_w=1, t_w)$. Alignment warps images in the direction opposite to motion.

Figure 3:
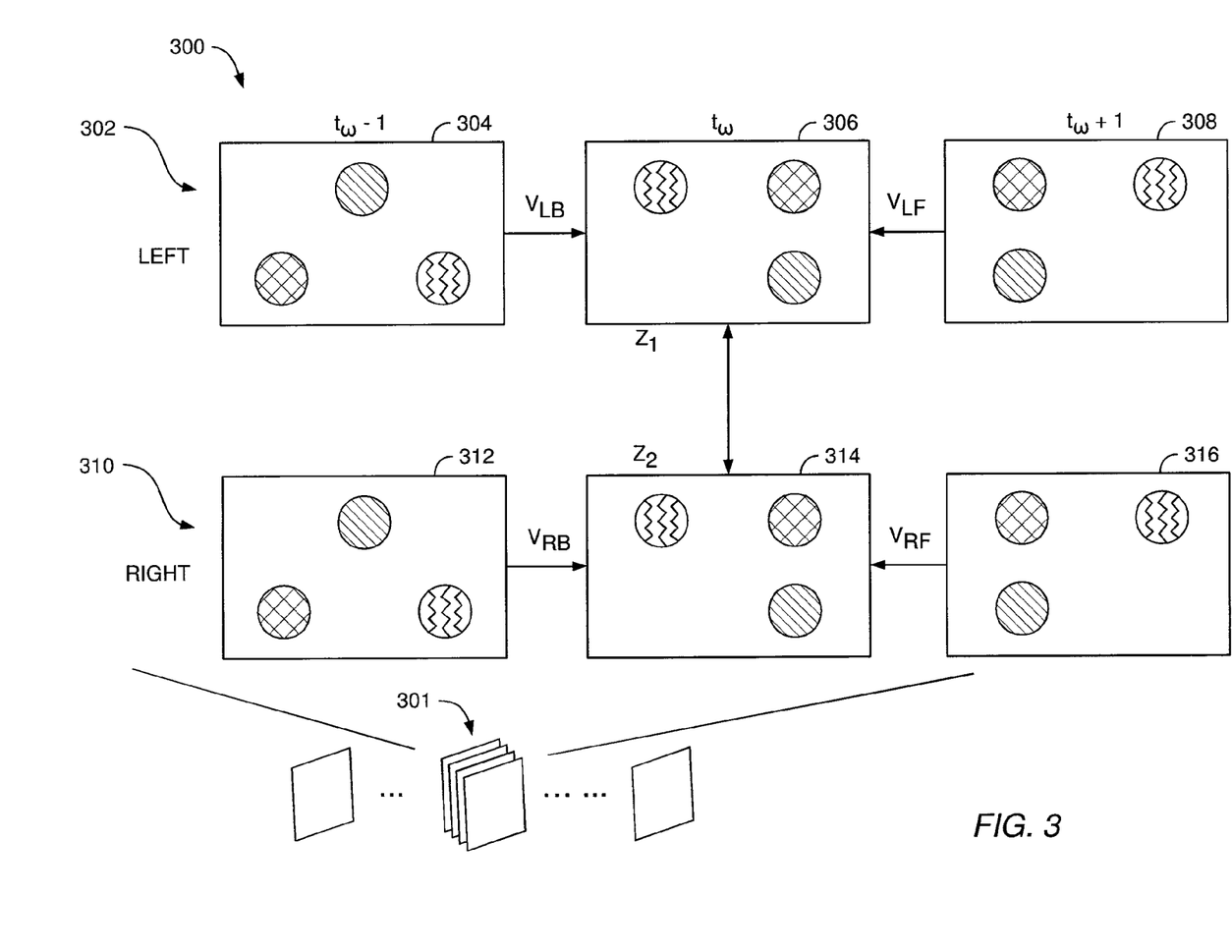
FIG. 3 is a block diagram illustrating a three flame sliding window of images taken from a left camera and a right camera, according to one embodiment.

FIG. 3 illustrates a three-frame sliding window 300 of images taken from a left camera and a right camera. Row 302 represents three frames 304, 306, 308 taken at time $t_w-1$, $t_w, t_w+1$ respectively, from the left camera. The circles depicted in each frame 304, 306, 308 represent which of the lights from the colored light sources 102 (seen in FIG. 1) were used to illuminate the target object in that respective frame. Row 310 represents three frames 312, 314, 316 taken at time $t_w-1$, $t_w, t_w+1$ respectively, from the right camera. The image frames 304, 306, 308, 312, 314, and 316 are taken from a plurality of images 301 captured by the plurality of cameras. The frames 304, 312 at time $t_w-1$ are illuminated by a first set of RGB lights. The frames 306, 314 at time $t_w$ are illuminated by a second set of RGB lights. The frames 308, 316 at time $t_w+1$ are illuminated by a third set of RGB lights.

Unknowns are encoded simply and effectively on image grids of each view, both left view and right view, at time $t_w$. The three-dimensional surface of the target object is parameterized by depth maps $Z_L$ and $Z_R$ between the row 302 of left image frames and the row 310 of right image frames. Forwards and backwards three-dimensional motions between image frames are each encoded by two two-dimensional optical flow fields (one per view) with cross-view consistency constraints to account for an extra degree of freedom. The forwards and backwards vector fields are denoted $V_{LF}$, $V_{RF}$, and $V_{LB}$, $V_{RB}$, respectively.

The three-dimensional surface of the target object is generated by iteratively reconstructing a surface estimate of the target object and aligning images of the target using motion estimation until the images converge. Reconstructing a surface estimate of the target object is defined in terms of the surface energies of the target object, i.e. $E_{surf}(X_L,X_R)$, where $X_c=\{Z_c, V_{cB}, V_{cF}\}$, for $c \in \{L,R\}$. Aligning images of the target object is defined in terms of the flow energies of the target object, i.e. $E_{flow}(X_L,X_R)$. The three-dimensional surface and motion of the target object is generated by minimizing $E_{surf}$ and $E_{flow}$ in a coupled manner, and in alternation, following a coarse-to-fine approach with Gaussian image pyramids. This can be represented by Equation (1).

$$\min_{X_L,X_R} E_{surf}(X_L,X_R) + E_{flow}(X_L,X_R). \quad (1)$$

Estimating the parameters in the surface energy and the flow energy requires establishing pixel correspondences across time and views. Because changes in illumination are rapid and significant, the traditional assumption of constant pixel brightness needed to be revised.

To derive the surface and flow energies, a Lambertian model and basic albedo constraint is first defined herein. First, consider a Lambertian surface patch p with RGB albedo $\alpha_p=[\alpha_p^r, \alpha_p^g, \alpha_p^b]$ and normal vector $\vec{n}_p$ at a particular time t. The patch p is simultaneously illuminated by three directional lights of distinct colors $T_p$, such as the three sets of RGB lights in FIG. 1. Let $\vec{i}_r, \vec{i}_g, \vec{i}_b \in \mathbb{R}^3$ denote their light direction vectors scaled by the corresponding light intensity. For simplicity of notation, the normal and light vectors are represented within a camera's local coordinate system. The surface patch p is depicted by an RGB pixel $\vec{i}_p = [i_p^r, i_p^g, i_p^b]^T$, $$\vec{i}_p = M^{-1}\hat{i}_p = \begin{bmatrix} \alpha_p^r & & \\ & \alpha_p^g & \\ & & \alpha_p^b \end{bmatrix} \begin{bmatrix} \vec{i}_r^T \\ \vec{i}_g^T \\ \vec{i}_b^T \end{bmatrix} \vec{n}_p, \quad (2)$$

where $\hat{i}_p$ has the captured, raw pixel values. Each column of the mixing matrix $M=[\hat{m}_r, \hat{m}_g, \hat{m}_b] \in \mathbb{R}^{3\times3}$ encodes the RGB color of a light source as seen by a camera. Here, illumination parameters $M, \hat{i}_r, \hat{i}_g, \hat{i}_b$ are pre-calibrated for each triplet of LEDs, such as the light sources 102 in FIG. 1, using a white diffuse sphere and mirrored sphere. The unknowns in Equation (2) are therefore the RGB albedo $\vec{\alpha}_p$ and normal vector $\vec{n}_p$.

To derive the albedo consistency constraint, consider a pair of corresponding pixels (p, p') from two images (1,2) across time or cameras. For example, consider a right view image and a left view image. The value of each pixel is denoted $i_{p,1}^\lambda$, and $i_{p',2}^\lambda$ for each color channel $\lambda \in \{r, g, b\}$. From Equation (2), the basic pairwise image relation in photogeometric scene flow is defined in Equation (3).

$$\alpha_{p,1}^\lambda \approx \alpha_{p',2}^\lambda \Rightarrow \frac{i_{p,1}^\lambda}{\vec{i}_{\lambda,1}^T \vec{n}_p} \approx \frac{i_{p',2}^\lambda}{\vec{i}_{\lambda,2}^T \vec{n}_{p'}} \quad (3)$$

To simplify notation, $\lambda$ is omitted in the following equations, but it is noted that pairs of the same color channel are always considered in the present disclosure. When two images are taken from adjacent time instants (t,t'), this relation also implies the standard assumption in time multiplexed photometric stereo that $\vec{n}_{p,t} \approx \vec{n}_{p',t'}$. This assumption corresponds to an as-rigid-as-possible, small motion model that is common in optical/scene flow methods.

The pairwise image relation in Equation (3) is completely defined by motion (correspondence) and geometry ($\hat{n}_p$), without actually requiring explicit albedo estimates. This fact eliminates a large number of unknowns, because per-pixel RGB albedo does not need to be computed to obtain a solution to the three-dimensional surface reconstruction. Having defined the Lambertian model and basic albedo constraint, the present disclosure now turns to the technique for surface reconstruction.

Figure 4:
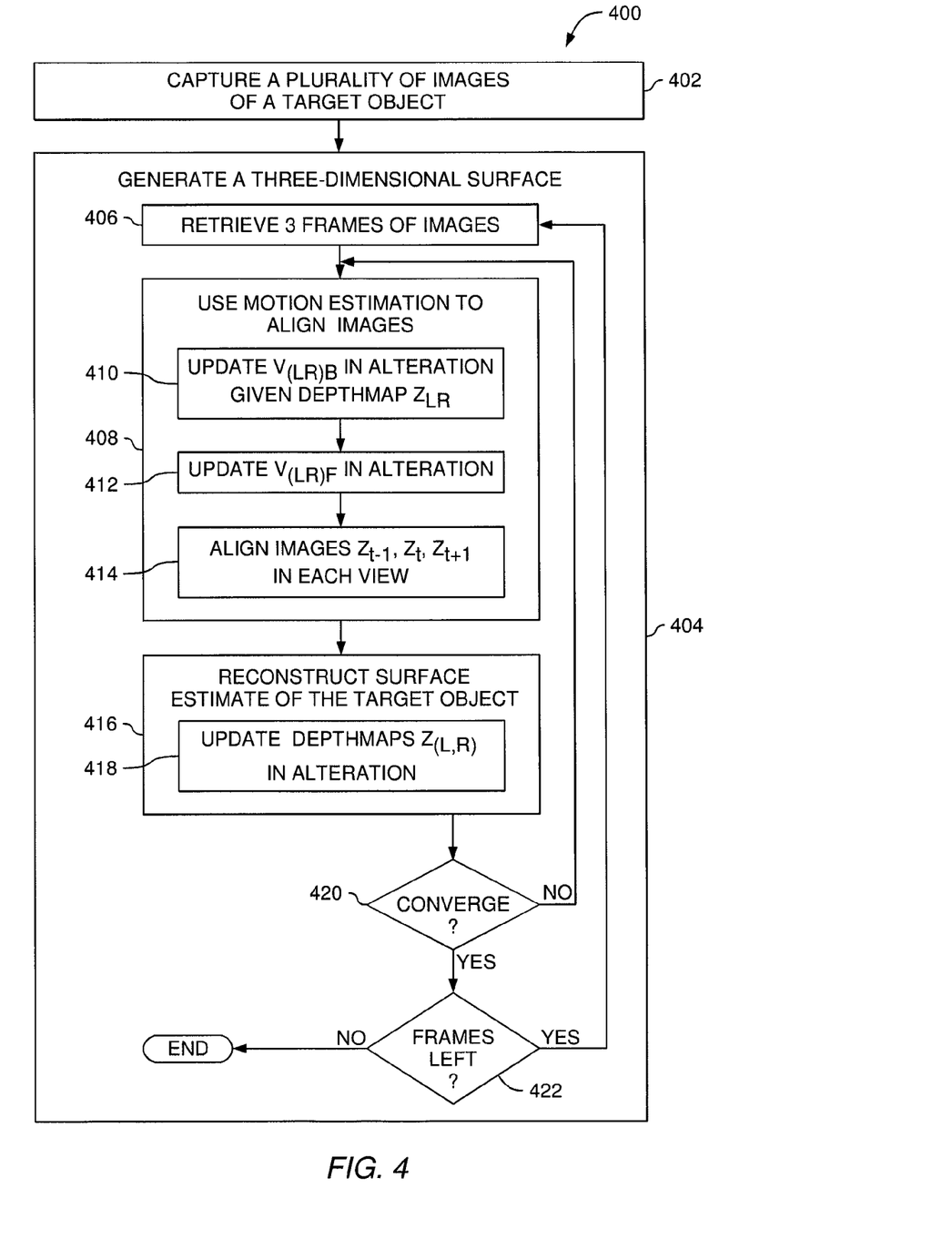
FIG. 4 is a flow diagram illustrating a method for generating a three-dimensional surface, according to one embodiment of a present disclosure.

FIG. 4 is a flow diagram illustrating a method 400 for generating a three-dimensional surface, according to an embodiment of the present disclosure. At step 402, the cameras capture a plurality of images of a target object. At step 404, the controller generates a three-dimensional surface of the target object. Step 404 utilizes Equation (1) to generate the three-dimensional surface of the target object. Steps 402 and 404 of method 400 may be performed similar to the steps 202 and 204 of method 200.

At step 406, the controller retrieves three frames of images from the plurality of images of the target object captured by the plurality of cameras. The three frames of images will represent images at time frames $t_w+1, t_w, t_w-1$. Each frame will have both a left image and a right image.

At step 408, the controller uses motion estimation to align the three frames of images in each camera view. Motion estimation is used to obtain optical flow under an illumination change. The idea is to take advantage of known surface normal, and illumination to relight input images to closely resemble each other. Given depth map estimates, an unary and binary motion energy is defined in Equation (4) in terms of the four two-dimensional flows $V_{c\delta}$ for $c \in \{L,R\}$ and direction $\delta \in \{B,F\}$.

$$E_{flow}(X_L,X_R) = \Sigma_{c,\delta} E_{PF}(V_{c\delta}) + \beta_3 E_{TV}(V_{c\delta}) + \Sigma_\delta \beta_4 E_{SF}(V_{L\delta}, V_{R\delta}), \quad (4)$$

where $\beta_3, \beta_4$ are fixed energy weights. The energy $E_{TV}(V_{c\delta})$ represents a typical total variation regularizer. The photometric flow $E_{PF}$ and scene flow $E_{SF}$ energies are derived as follows.

Photometric Flow Energy

Consider the basic pairwise image relation in Equation (3) for pairs of images in the same view but at different times with $t=t_w$ and $t' \in \{t_w-1, t_w+1\}$ having known illumination and normal vectors, shading terms in the denominators of Equation (3) as the scalar $s_{pt}=\vec{i}_t^T \vec{n}_p$. Using the basic pairwise image relation of Equation (3), relighting relation shown in Equation (5) can be obtained, $$s_{p't'}i_t(\vec{u}_p) \approx s_{pt}i_{t'}(\vec{u}_p) \text{ where } \vec{u}_{p'} = \vec{u}_p + \vec{w}_{p'} \quad (5)$$

defined between two cross-shaded images. The coordinates of $\vec{u}_p$, are defined by the two-dimensional flow $\vec{w}_p \in V_{c\delta}$. Because the surface shading terms are already defined on the image grid at time t, only the image at time t' is warped.

The relighting relation of Equation (5) can be understood as using the known illumination patterns to relight $i_t$ and $i_{t'}$ to closely match each other. Relighting facilitates optical flow computation because differences in illumination are cancelled. Relighting also down-weights the influence of pixels with small shading values (i.e., high photometric foreshortening).

The relighting relation of Equation (5) incorporates an image warp (i.e., the two-dimensional flow field $\vec{w}_p$) and reflects the fact that image alignment improves photometric reconstruction, and photometric reconstruction improves image alignment. For $\vec{w}_p \in V_{c\delta}$, the photometric flow energy defined in Equation (6) is the alignment error between cross-shaded images.

$$E_{PF}(V_{c\delta}) = \Sigma_{p,\lambda}(s_{pt}i_{t'}(\vec{u}_p + \vec{w}_p) - s_{pt'}i_t(\vec{u}_p))^2, \tag{6}$$

The image indexing operation results in nonlinear energy minimization. Linearizing the photometric flow energy of Equation (6) yields one constraint (per pixel) on the update $\Delta \vec{w}_p \in \mathbb{R}^2$, shown in Equation (7).

$$s_{pt}\nabla i_{t'}(\vec{u}_{p'})\Delta \vec{w}_p + (s_{pt}i_{t'}(\vec{u}_{p'}) - s_{pt'}i_t(\vec{u}_p)) \approx 0, \tag{7}$$

The result of Equation (7) is a new, relit form of the space-time gradient in standard optical flow.

Scene Flow

The scene flow energy term encourages the two-dimensional flows $V_{L\delta}$ and $V_{R\delta}$ to be consistent with a three-dimensional vector field, thus fixing an extra degree of freedom (per pixel) in the parameterization, which could introduce errors into the estimated flows.

Let (p, p') denote corresponding pixels across views, defined by the depth maps $\vec{z}_c$. Their two-dimensional flow vectors are $\vec{w}_p \in V_{L\delta}$ and $\vec{w}_{p'} \in V_{R\delta}$. The pixels and displacements are related by a projection that yields Equation (8), $$\vec{w}_{p'} = \frac{A[(\vec{u}_p + \vec{w}_p)^T 1]^T (z_p + w_p^z) + \vec{b}}{\vec{c}^T[(\vec{u}_p + \vec{w}_p)^T 1]^T (z_p + w_p^z) + d} - \vec{u}_{p'}, M = \begin{bmatrix} A & \vec{b} \\ \vec{c}^T & d \end{bmatrix} \tag{8}$$

where $M_{c',c} \in \mathbb{R}^{3 \times 4}$ is a projection matrix from view c to view c' (including camera intrinsics), and $A \in \mathbb{R}^{2 \times 3}$.

Equation (8) provides two linear constraints on the unknown scalar $w_z^p$, the third component of the three-dimensional scene flow represented in view c. Therefore, after each update of the two-dimensional flows, the technique computes $w_p^z$ and enforce that the two-dimensional flows are consistent with the projections of a single three-dimensional scene flow. This consistency is enforced symmetrically, on both views, by minimizing the scene flow energy shown in Equation (9).

$$E_{SF}(V_{L\delta}, V_{R\delta}) = \Sigma_{p,c} ||\vec{w}_p - P(\vec{w}_{p'}, w_p^z)||_2^2 \gamma_p \tag{9}$$

where $P(\cdot)$ is as in Equation (8) (i.e., a projection similar to M), and $\gamma_p$ is an occlusion weight.

Referring back to FIG. 4, after motion estimation is used to align frames of images, at step 416, the controller 110 reconstructs a surface estimate of the target object. In some embodiments, the surface estimation step performs simultaneous photometric stereo and binocular stereo, given current estimates of the 2D flows (i.e., pre-aligned images). Thus, surface estimation at time t can be formulated as a rigid problem once motion has been removed from the input.

In one embodiment, reconstructing the surface estimate of the target object may include, at step 418, updating depth maps $Z_{L,R}$ in alteration. Surface estimation at a time t can be formulated by removing the motion factor between frames from the input. To emphasize that the motions between frames are treated as constants during surface updating, the surface energies in Equation (10) can be expressed only in terms of depth map $Z_c$ in each camera view.

$$E_{surf}(X_L, X_R) = \Sigma_c(E_{PS}(Z_c) + \alpha E_{SM}(Z_c)) + \beta E_{LR}(Z_L, Z_R) \tag{10}$$

The different energies represent photometric stereo, stereo matching, and left/right consistency energies. All constraints are represented in terms of $Z_c$ to take advantage of the complementary nature of photometric stereo and multi-view stereo. This advantageously avoids the need to compute intermediary results (e.g., normal vectors and disparity) that can propagate errors.

Photometric Stereo

Using the basic pairwise image relation in Equation (3) and a pair of images $t,t' \in (t_w-1, t_w, t_w+1)$ in the same view c, by cross-multiplying the denominators, the basic pairwise image relation may be written as Equation (11)

$$i_{pt'}\vec{l}_t^T - i_{pt}\vec{l}_{t'}^T) \vec{n}_p \approx 0, \tag{11}$$

where $i_{pt'}\vec{l}_t^T - i_{pt}\vec{l}_{t'}^T$; corresponds to a constant vector $[a_{ptt'} b_{ptt'} c_{ptt'}]$ that is orthogonal to $\vec{n}_p$. The linear constraint can now be related to the gradient field $\nabla z_p$ of depth values $z_p = Z_c(u_p, v_p)$ where $(u_p, v_p)$ are the coordinates of pixel p on the image grid of view c.

Equation (12) provides a model for $\vec{n}_p$ in perspective photometric stereo.

$$\vec{n}_p \propto \begin{bmatrix} 1 & & \\ & 1 & \\ \frac{u_p}{f_c} & \frac{v_p}{f_c} & \frac{1}{f_c} \end{bmatrix} \begin{bmatrix} \nabla z_p \\ z_p \end{bmatrix}, \tag{12}$$

where $f_c$ is the focal distance of camera c and $\alpha$ denotes up-to-scale equality. Because the rewritten basic pairwise image relation in Equation (11) is up-to-scale as well, it can be combined with the perspective photometric stereo relation in Equation (12) to yield a photometric energy term in Equation (13) over all pixels p and pairs of images (t,t').

$$E_{PS}(Z_c) = \sum_{p,t,t',\lambda} \left( \begin{bmatrix} a_{ptt'} \\ b_{ptt'} \\ c_{ptt'} \end{bmatrix}^T \begin{bmatrix} 1 & & \\ & 1 & \\ \frac{u_p}{f_c} & \frac{v_p}{f_c} & \frac{1}{f_c} \end{bmatrix} \begin{bmatrix} \nabla z_p \\ z_p \end{bmatrix} \right)^2 \tag{13}$$

Because $\nabla z_p$ is a linear function of $Z_c$ (using forwards derivatives), minimizing Equation (13) is equivalent to solving a large and sparse linear system of (homogenous) equations on the depth map $Z_c$.

Considering all pairs of images in the three-frame window, and all three RGB color channels $\lambda$, there are six independent constraints on the two degrees of freedom of $\vec{n}_p$ or $\nabla z_p$. The overconstraint is welcoming because, in practice, the effective number of constraints may be reduced by self-shadowing in one or more color channels.

Stereo Matching

The basic pairwise constraint is now applied to image pairs (c,c') at the same time t but across views. To simplify notation, time index t has been omitted. Both images present illumination $T_t$, so the denominators in the basic pairwise constraint of Equation (3) may be dropped. Let $\vec{u}_p=(u_p, v_p)$ denote pixel coordinates of p. Equation (14) provides a stereo matching relation, such that at each time instant in the three-frame window, $$i_c(\vec{u}_p)=i_{c'}(\vec{u}_{p'}), \text{ where } \vec{u}_{p'}=\vec{u}_p+\vec{w}_{p'} \quad (14)$$

and $\vec{w}_p \in \mathbb{R}^2$ is a displacement along the epipolar line. By expressing $\vec{w}=w(z_p)$ in terms of $z_p=Z_c(\vec{u}_p)$ and camera calibration, stereo matching can be performed while solving directly for the depth map. The result is a set of non-linear constraints on $Z_c$ that are enforced iteratively. Nevertheless, this task can be incorporated naturally into the coarse-to-fine optimization strategy.

The described approach advantageously allows for both (1) direct triangulation of continuous depth values and (2) the new stereo matching constraints on $z_p$ (absolute depth) and the previous photometric constraints on $\nabla z_p$ (relative depth, detail) complementing each other naturally. The constraints render it unnecessary to define a spatial smoothness term for stereo matching, which could blur surface detail.

The two dimensional displacement vector along the epipolar line is represented in Equation (15).

$$w(z_p) = \frac{A[\vec{u}_p^T 1]^T z_p + \vec{b}}{\vec{c}^T[\vec{u}_p^T 1]^T z_p + d} - \vec{u}_p, \quad M_{c'c} = \begin{bmatrix} A & \vec{b} \\ \vec{c}^T & d \end{bmatrix}, \quad (15)$$

where $M_{c'c} \in \mathbb{R}^{3 \times 4}$ is a projection matrix from view c to view c' (including camera intrinsics), and $A \in \mathbb{R}^{2 \times 3}$.

The stereo matching energy term is therefore defined in Equation (16).

$$E_{SM}(Z_c)\Sigma_{p,t,\lambda}(i_c(\vec{u}_p+w(z_p))-i_{c'}(\vec{u}_p))^2 \gamma_p, \quad (16)$$

where $\gamma_p$ is an occlusion weight based on foreshortening and consistency of pairs (p, p') given by $Z_L$ and $Z_R$.

During optimization, the energy $E_{SM}(Z_c)$ is linearized about the current estimate of each $z_p$. This yields a linear update term (or gradient) for the surface update $\nabla z_p$, shown in Equation (17).

$$\nabla i_c(\vec{u}_{p'})^T J_w \Delta z_p = i_c(\vec{u}_p) - i_{c'}(\vec{u}_{p'}), \quad (17)$$

where $J_w \in \mathbb{R}^2$ is the Jacobian of $w(z_p)$ in Equation (15), i.e., the two-dimensional displacement vector along the epipolar line.

Cross-View Consistency

To enforce that $Z_L$ and $Z_R$ provide a consistent representation for those surface patches that are visible on both views, the cross-view consistency energy term is defined in Equation (18).

$$E_{LR}+\Sigma_{c \leftrightarrow c'} \Sigma_p (\vec{c}^T [\vec{u}_p^T 1]^T z_p^c + d - z_p^{c'})^2 \gamma_{p'} \quad (18)$$

based on the projection matrices $M_{c'c} \in \mathbb{R}^{3 \times 4}$ in Equation (15). By optimizing $Z_L$ and $Z_R$ in an alternating manner, the cross-view consistency energy in Equation (18) can also be treated as a set of linear constraints.

Referring back to FIG. 4, after the surface estimate of the target object is reconstructed, at decision block 420, the controller 110 determines whether the three frames of images have converged. Responsive to determining that the three frames of images have not converged, then the method reverts to step 408. Steps 408 through 416 are then performed iteratively until the three frames of images converge (energies achieve their minimum value).

Responsive to determining that the three frames of images have converged, the controller 110 deems that the generated geometry (surface) is sufficiently reconstructed at the time t. In some embodiments, the controller 110 determines the appearance of the generated geometry by computing the final RGB albedo at a time t using Equation (2). The controller can then proceed to a different three-frame window.

At decision block 422, the controller 110 determines whether there are any frames left in the plurality of images captured. If there are frames left in the plurality of images captured, then the method flow 400 reverts to step 406, and three frames of images are retrieved. For example, if there are twelve frames of images in the plurality of images captured (e.g. frames 1-12), and frames 1, 2, and 3 were initially chosen, then frames 2, 3, and 4, may be chosen next. If there are no remaining frames in the plurality of images captured, then the method 400 is complete.

Figure 5:
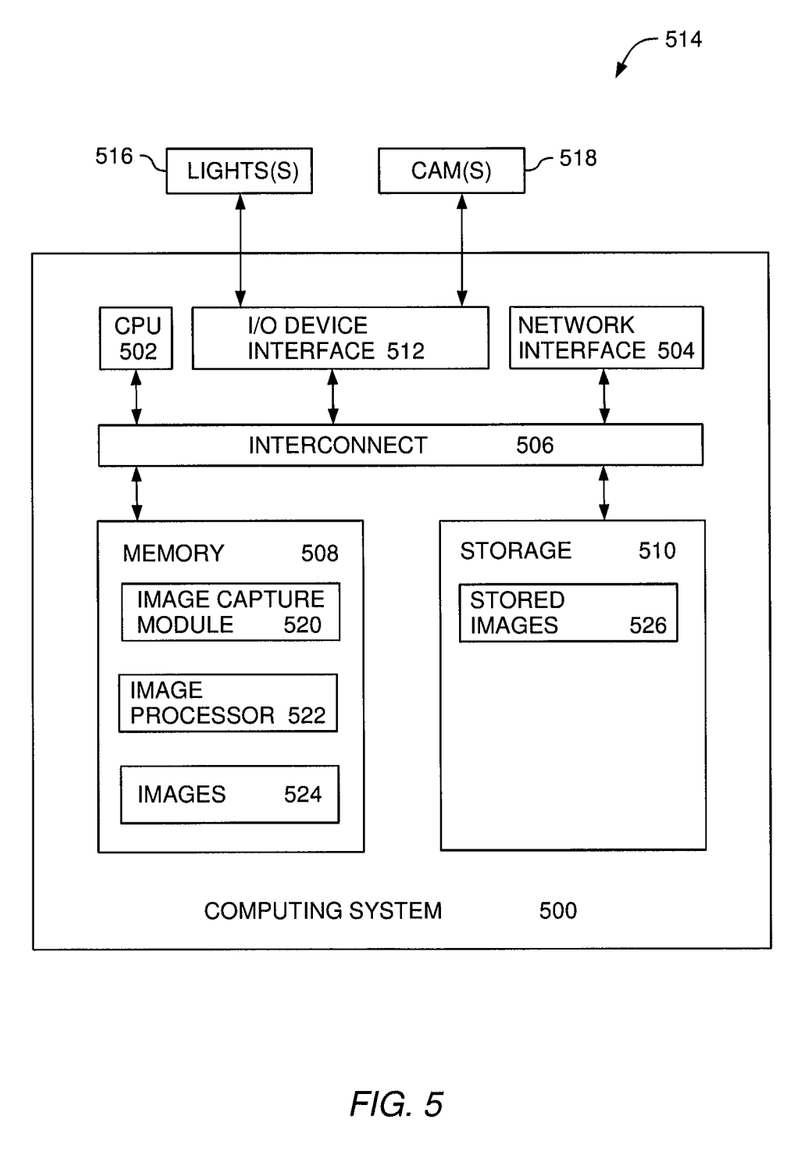
FIG. 5 is a block diagram illustrating an example computing system configured according to an embodiment.

FIG. 5 illustrates an example computing system 500 configured according to an embodiment disclosed herein. The computing system 500 includes a central processing unit (CPU) 502, a network interface 504, a bus 506, a memory 508, and storage 510. The computing system 500 also includes an I/O device interface 512, connecting the computing system 500 to I/O devices 514, such as lights 516 and cameras 518. The lights 516 may be the plurality of light sources 102 in FIG. 1. The cameras 518 may be the cameras 106 in FIG. 1. The computing system 500 provides a computing system, which allows a user to generate a three-dimensional surface of a target object, such as controller 110 in FIG. 1.

The CPU 502 retrieves and executes programming instructions stored in the memory 508. Similarly, the CPU 502 stores and retrieves application data residing in the memory 508. The bus 506 is used to transmit programming instructions and application data among the CPU 502, I/O devices interface 512, memory 508, network interface 504, and storage 510 having images 526 stored therein. CPU 502 is included to be representative of a single CPU, multiple CPUs, a single CPU having multiple processing cores, and the like. The memory 508 is generally included to be representative of a random access memory. The storage 510 may be a disk drive device. Although shown as a single unit, the storage 510 may be a combination of fixed and/or removable storage devices, such as magnetic disc drives, solid state drives (SSD), removable memory cards, optical storage, network attached storage (NAS), or a storage area-network (SAN).

The memory 508 includes an image capture module 520, an image processor 522, and images 524. The image capture module 520 provides a software application configured to receive a plurality of images of a target object taken by a system for generating three-dimensional surfaces, such as system 100 in FIG. 1. The image processor 522 is configured to generate a three-dimensional surface of a target object by iteratively using motion estimation to align frames of images, such as images 524 stored in memory, and reconstructing a surface estimate of the target object. For example, image processor 522 can perform the method 400 described in FIG. 4.

Embodiments disclosed herein relate to a method and apparatus for generating a three-dimensional surface. In one embodiment, there is a method for generating a three-dimensional surface. The method includes capturing a plurality of images of a target object with at least two cameras, the target object illuminated by at least three sets of red-green-blue (RGB) lights positioned in an array about the target object and generating a three-dimensional surface of the target object by iteratively reconstructing a surface estimate of the target object and aligning images of the target object using motion estimation until the images converge, wherein the images are processed in three-frame intervals.

While the foregoing is directed to embodiments of the present invention, other and further embodiments of the invention may be devised without departing from the basic scope thereof, and the scope thereof is determined by the claims that follow.

What is claimed is:

1. A method for generating a three-dimensional surface, comprising:
   capturing a plurality of images of a target object with at least two cameras, the target object illuminated by at least two sets of red-green-blue (RGB) lights positioned in an array about the target object; and
   generating a three-dimensional surface of the target object by iteratively reconstructing a surface estimate of the target object and aligning images of the target object using motion estimation until the images converge, wherein the images are processed in n-frame intervals.

2. The method of claim 1, wherein at least one camera captures the plurality of images of the target object from a first side and at least one camera captures the plurality of images of the target object from a second side.

3. The method of claim 1, wherein aligning images of the target object using motion estimation comprises:
   recovering a backward motion and forward motion within each respective n-frame interval.

4. The method of claim 1, wherein each frame in the n-frames recovered for the three-dimensional surface is taken from a right side and a left side of the target object.

5. The method of claim 1, wherein reconstructing the surface estimate comprises:
   updating depth maps of the images processed in n-frame intervals.

6. The method of claim 1, wherein reconstructing the surface estimate of the target object is defined in terms of surface energies of the target object.

7. The method of claim 1, wherein aligning images of the target object using motion estimation is defined in terms of flow energies of the target object.

8. A method for generating a three-dimensional surface, comprising:
   capturing an image of a target object with two cameras, one camera positioned to a left of the target object, one camera position to a right of the target object, wherein the target object is illuminated by three sets of red-green-blue (RGB) lights positioned in an array about the target object; and
   processing the image in three frame intervals, wherein processing the image comprises:
      recovering an unknown surface at each frame within a three-frame interval; and
      recovering a backward motion and forward motion within the three-frame interval.

9. The method of claim 8, wherein each frame in the three frames recovered for the three-dimensional surface is taken from a right side and a left side of the target object.

10. The method of claim 8, wherein the image is iteratively processed three frames at a time until images in the three frames converge to a single image of the target object.

11. The method of claim 8, wherein recovering the unknown surface at each frame within the three-frame interval is defined in terms of surface energies of the target object.

12. The method of claim 8, wherein recovering the unknown surface at each frame within the three-frame interval comprises:
    updating depth maps of the images processed in three frame intervals.

13. The method of claim 12, where the depth maps are updated between frames generated by the camera positioned to the left of the target object and the camera positioned to the right of the target object.

14. The method of claim 8, wherein recovering the backward motion and forward motion within the three-frame interval is defined in terms of flow energies of the target object.

15. A system for reconstructing a three-dimensional surface, comprising:
    at least two cameras, wherein a first camera of the at least two cameras is positioned to capture a right image of a target object, and wherein a second camera is positioned to capture a left image of the target object;
    at least three sets of red-green-blue (RGB) lights positioned in an array about the target object; and
    a controller configured to generate a three-dimensional surface of the target object by iteratively reconstructing a surface estimate of the target object and aligning images of the target object using motion estimation until the images converge, wherein the images are processed in three-frame intervals.

16. The system of claim 15, wherein the three sets of RGB lights are mounted on a circular configuration.

17. The system of claim 15, wherein the cameras are positioned about 200 cm away from the three-dimensional surface.

18. The system of claim 15, wherein the sets of RGB lights are positioned about 60 cm away from the cameras.

19. The system of claim 15, wherein aligning images of the target object using motion estimation is defined in terms of flow energies of the target object.

20. The system of claim 15, wherein generating the surface estimate of the target object is defined in terms of surface energies of the target object.

* * * * *

UNITED STATES PATENT AND TRADEMARK OFFICE
CERTIFICATE OF CORRECTION

PATENT NO. : 9,883,167 B2
APPLICATION NO. : 14/866540
DATED : January 30, 2018
INVENTOR(S) : Iain Matthews et al.

It is certified that error appears in the above-identified patent and that said Letters Patent is hereby corrected as shown below:

In the Specification

In Column 4, Line 54, delete "($t_w$=1," and insert -- ($t_w$-1, --, therefor.

In Column 5, Line 22, delete "$c\Sigma\{L,R\}$." and insert -- $c\in\{L,R\}$. --, therefor.

In Column 5, Line 40, delete "$\bar{n}_p$" and insert -- $\vec{n}_p$ --, therefor.

In Column 5, Line 43, delete "$\bar{i}_r, \bar{i}_g, \bar{i}_b \in \mathbb{R}^3$" and insert -- $\vec{i}_r, \vec{i}_g, \vec{i}_b \in \mathbb{R}^3$ --, therefor.

In Column 5, Line 48, delete "$\bar{i}_p$" and insert -- $\vec{i}_p$ --, therefor.

In Column 5, Line 58, delete "$\mathbb{R}^{3\times 3}$" and insert -- $\mathbb{R}^{3\times 3}$ --, therefor.

In Column 5, Line 63, delete "$\bar{\alpha}_p$" and insert -- $\vec{\alpha}_p$ --, therefor.

In Column 5, Line 64, delete "$\bar{n}_p$" and insert -- $\vec{n}_p$ --, therefor.

In Column 6, Line 2, delete "$i_{p,1}^\lambda$" and insert -- $i_{p,1}^\lambda$ --, therefor.

In Column 6, Line 2, delete "$i_{p',2}^\lambda$" and insert -- $i_{p',2}^\lambda$ --, therefor.

Signed and Sealed this
Seventh Day of August, 2018

Andrei Iancu
*Director of the United States Patent and Trademark Office*

CERTIFICATE OF CORRECTION (continued)

In Column 6, Line 16, delete "$\vec{n}_{p,t} \approx \vec{n}_{p',t''}$" and insert --$\vec{n}_{p,t} \approx \vec{n}_{p',t'}$--, therefor.

In Column 6, Line 67, delete "$s_{pt'}i_t(\vec{u}_p) \approx s_{pt}i_t(\vec{u}_p)$ where $\vec{u}_{p'} = \vec{u}_p + \vec{w}_{p'}$" and insert --$s_{pt'}i_t(\vec{u}_p) \approx s_{pt}i_{t'}(\vec{u}_p)$ where $\vec{u}_{p'} = \vec{u}_p + \vec{w}_p$,--, therefor.

In Column 7, Line 2, delete "$\vec{u}_{p'}$" and insert --$\vec{u}_{p'}$--, therefor.

In Column 7, Line 2, delete "$\vec{w}_p$" and insert --$\vec{w}_p$--, therefor.

In Column 7, Line 13, delete "$\vec{w}_p)$" and insert --$\vec{w}_p)$--, therefor.

In Column 7, Line 16, delete "$\vec{w}_p$" and insert --$\vec{w}_p$--, therefor.

In Column 7, Line 20, delete "$E_{PF}(V_{c\delta}) = \Sigma_{p,\lambda}(s_{pt}i_t(\vec{u}_p + \vec{w}_p) - s_{pt}i_t(\vec{u}_p))^2$," and insert --$E_{PF}(V_{c\delta}) = \sum_{p,\lambda}(s_{pt}i_{t'}(\vec{u}_p + \vec{w}_p) - s_{pt'}i_t(\vec{u}_p))^2$,--, therefor.

In Column 7, Line 24, delete "$\Delta \vec{w}_p \in \mathbb{R}^2$," and insert --$\Delta \vec{w}_p \in \mathbb{R}^2$,--, therefor.

In Column 7, Line 25, delete "$s_{pt}\nabla i_t(\vec{u}_{p'})\Delta \vec{w}_p + (s_{pt}i_t(\vec{u}_{p'}) - s_{pt}i_t(\vec{u}_p)) \approx 0$," and insert --$s_{pt}\nabla i_{t'}(\vec{u}_{p'})\Delta \vec{w}_p + (s_{pt}i_{t'}(\vec{u}_{p'}) - s_{pt'}i_t(\vec{u}_p)) \approx 0$,--, therefor.

In Column 7, Line 38, delete "$\vec{Z}_c$." and insert --$\vec{Z}_c$.--, therefor.

In Column 7, Line 39, delete "$\vec{w}_p$" and insert --$\vec{w}_p$--, therefor.

In Column 7, Line 39, delete "$\vec{w}_p \in$" and insert --$\vec{w}_{p'} \in$--, therefor.

In Column 7, Line 48, delete "$\mathbb{R}^{3\times 4}$" and insert --$\mathbb{R}^{3\times 4}$--, therefor.

CERTIFICATE OF CORRECTION (continued)
U.S. Pat. No. 9,883,167 B2

In Column 7, Line 49, delete "$\mathbb{R}^{2\times 3}$" and insert -- $\mathbb{R}^{2\times 3}$ --, therefor.

In Column 7, Line 60, delete "$E_{SF}(V_{L\delta}, V_{R\delta})=\Sigma_{p,c}\|\vec{w}_p - P(\vec{w}_{p'}, w_p^z)\|_2^2 \gamma_p$" and insert -- $E_{SF}(V_{L\delta}, V_{R\delta})=\Sigma_{p,c}\|\vec{w}_p - P(\vec{w}_{p'}, w_p^z)\|_2^2 \gamma_p$ --, therefor.

In Column 8, Line 28, before "$i_{p'l'}\vec{l}_l^T - i_{pl}\vec{l}_{l'}^T$" insert -- ( --.

In Column 8, Line 29, before "corresponds" delete ";".

In Column 8, Line 30, delete "$\vec{n}_p \cdot$" and insert -- $\vec{n}_p \cdot$ --, therefor.

In Column 8, Line 34, delete "$\vec{n}_p$" and insert -- $\vec{n}_p$ --, therefor.

In Column 8, Line 64, delete "$\vec{n}_p$" and insert -- $\vec{n}_p$ --, therefor.

In Column 9, Line 7, delete "$\vec{u}_p$" and insert -- $\vec{u}_p$ --, therefor.

In Column 9, Line 11, delete "$i_c(\vec{u}_p)=i_{c'}(\vec{u}_{p'})$, where $\vec{u}_{p'}=\vec{u}_p+\vec{w}_{p'}$" and insert -- $i_c(\vec{u}_p)=i_{c'}(\vec{u}_{p'})$, where $\vec{u}_{p'}=\vec{u}_p + \vec{w}_{p'}$ --, therefor.

In Column 9, Line 12, delete "$\vec{w}_p$" and insert -- $\vec{w}_p$ --, therefor.

In Column 9, Line 13, delete "$(\vec{u}_p)$" and insert -- $(\vec{u}_p)$ --, therefor.

In Column 9, Line 14, delete "$\vec{w}$" and insert -- $\vec{w}_p$ --, therefor.

In Column 9, Line 35, delete "$\mathbb{R}^{3\times 4}$" and insert -- $\mathbb{R}^{3\times 4}$ --, therefor.

In Column 9, Line 36, delete "$\mathbb{R}^{2\times 3}$" and insert -- $\mathbb{R}^{2\times 3}$ --, therefor.

CERTIFICATE OF CORRECTION (continued)
U.S. Pat. No. 9,883,167 B2

In Column 9, Line 39, delete "$E_{SM}(Z_c)\Sigma_{p,t,\lambda}(i_{c'}(\vec{u}_p+w(z_p))-i_c(\vec{u}_p))^2\gamma_{p'}$," and insert -- $E_{SM}(Z_c)=\Sigma_{p,t,\lambda}\left(i_{c'}\left(\vec{u}_p+w(z_p)\right)-i_c(\vec{u}_p)\right)^2\gamma_{p'}$ --, therefor.

In Column 9, Line 47, delete "$\nabla i_{c'}(\vec{u}_{p'})^T J_w \Delta z_p = i_c(\vec{u}_p) - i_{c'}(\vec{u}_{p'})$," and insert -- $\nabla i_{c'}(\vec{u}_{p'})^T J_w \Delta z_p = i_c(\vec{u}_p) - i_{c'}(\vec{u}_{p'})$, --, therefor.

In Column 9, Line 48, delete "$\mathbb{R}^2$" and insert -- $\mathbb{R}^2$ --, therefor.

In Column 9, Line 59, delete "$E_{LR}+\Sigma_{c\sim c'}\Sigma_p(\vec{c}^T[\vec{u}_p^T 1]^T z_p^c+d-z_p^{c'})^2\gamma_{p'}$," and insert -- $E_{LR}=\Sigma_{c\neq c'}\Sigma_p\left(\vec{c}^T[\vec{u}_p^T 1]^T z_p^c+d-z_p^{c'}\right)^2\gamma_{p'}$ --, therefor.

In Column 9, Line 60, delete "$\mathbb{R}^{3\times 4}$" and insert -- $\mathbb{R}^{3\times 4}$ --, therefor.